United States Patent [19]

Hersch et al.

[11] Patent Number: 5,096,480
[45] Date of Patent: Mar. 17, 1992

[54] APPARATUS FOR RADIATIVELY COOLING GLASS SHEETS

[75] Inventors: Christopher Hersch, Perrysburg; Donivan M. Shetterly, Toledo, both of Ohio

[73] Assignee: Glasstech, Inc., Perrysburg, Ohio

[21] Appl. No.: 672,345

[22] Filed: Mar. 20, 1991

[51] Int. Cl.⁵ .............................................. C03B 27/04
[52] U.S. Cl. .................................. 65/288; 65/348; 65/349
[58] Field of Search ............... 65/348, 288, 273, 349, 65/289

[56] References Cited

U.S. PATENT DOCUMENTS

| | | | |
|---|---|---|---|
| 1,951,950 | 3/1934 | Rising | 65/348 X |
| 2,754,628 | 7/1956 | Dawe | 65/348 X |
| 2,864,203 | 12/1958 | Long | 65/348 |
| 3,298,810 | 1/1967 | McKelvey | 65/348 X |
| 3,600,150 | 8/1971 | Rougeux | 65/273 X |
| 4,397,672 | 8/1983 | Nitsche | 65/348 X |
| 5,021,075 | 6/1991 | Vanaschen et al. | 65/289 X |

Primary Examiner—Robert L. Lindsay
Attorney, Agent, or Firm—Brooks & Kushman

[57] ABSTRACT

An apparatus (10) for cooling a glass sheet (G) formed on an upwardly facing full face male glass sheet shaping mold (12) disclosed includes a glass sheet press ring (14) mounted on a press ring enclosure (16). A freeze plate (18) having first and second surfaces (20,22) is mounted in the press ring enclosure. A cooling means (24) mounted adjacent the freeze plate (18) cyclically cools the freeze plate (18) between a heated ambient temperature and a temperature significantly below the glass sheet (G) whereby the freeze plate (18) radiatively cools the glass sheet (G) formed on the full face glass sheet shaping mold (12) by the press ring (14) sufficiently so that the formed glass sheet (G) shape does not change upon further processing.

8 Claims, 2 Drawing Sheets

APPARATUS FOR RADIATIVELY COOLING GLASS SHEETS

TECHNICAL FIELD

This invention relates to forming heated glass sheets and more particularly to apparatus for radiatively cooling the formed glass sheets as part of a forming step so that the formed glass sheet retains its form shape for further processing.

BACKGROUND ART

In a glass sheet windshield forming operation such as that disclosed in U.S. patent application Ser. No. 527,344, a heated thin glass sheet is formed against an upwardly facing full face male glass sheet shaping mold. The glass sheet formed on the full face mold is subsequently picked up by vacuum for further processing. During the application of vacuum from above, the formed glass sheet often changes shape because of the plastic condition of the glass sheet. During the subsequent transfer to a glass sheet processing ring, the glass sheet tends to sag when the vacuum is released, but this sagging is insufficient to correct the upward deflection caused by the vacuum pick up.

U.S. Pat. No. 4,687,501 discloses the use of heat shields in connection with a glass sheet bending mold to control edge temperature of a glass sheet.

U.S. Pat. No. 4,297,188 discloses the movement of a glass sheet vacuum forming mold outside a furnace between successive bending operations to control the temperature rise of the mold.

U.S. Pat. No. 3,862,828 discloses controlling furnace roof temperature during glass sheet bending.

U.S. Pat. No. 3,600,150 discloses bending glass sheets between refrigerated bending forms to control temperature.

SUMMARY OF THE INVENTION

An object of the present invention is to provide an apparatus for cooling the surface of a glass sheet formed over an upwardly facing full face male mold by radiative heat exchange so that its bent shape does not change appreciably upon further processing.

A more specific object of the present invention is to provide an apparatus for radiatively cooling glass sheets comprising a glass sheet press ring for forming the glass sheet against an upwardly facing full face glass sheet male shaping mold. Such an operation is disclosed in U.S. patent application Ser. No. 527,344 which is hereby incorporated by reference.

A press ring enclosure mounts the press ring and a freeze plate having first and second surfaces is mounted in the press ring enclosure. The first surface of the freeze plate faces the full face glass sheet shaping mold. The freeze plate is cycled between a heated ambient temperature and a temperature significantly below the glass sheet temperature across its surface.

A cooling means mounted adjacent the second surface of the freeze plate cyclically cools the freeze plate to the temperature below the glass sheet temperature after the glass sheet is formed whereby the freeze plate radiatively cools the formed glass sheet sufficiently between the full face male mold and press ring so that its shape does not change upon further processing.

Preferably, the cooling means is an air distributor heat exchanger mounted in the enclosure for communicating cool air to the second surface of the freeze plate. A pumping means moves air into the air distributor. Most preferably, the apparatus also includes a vacuum generator to pull heated air away from the second surface of the freeze plate.

In the preferred embodiment of the present invention, the freeze plate is metallic and has a thin cross-section for rapid cooling between successive bending operations and the pumping means is an air blower.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
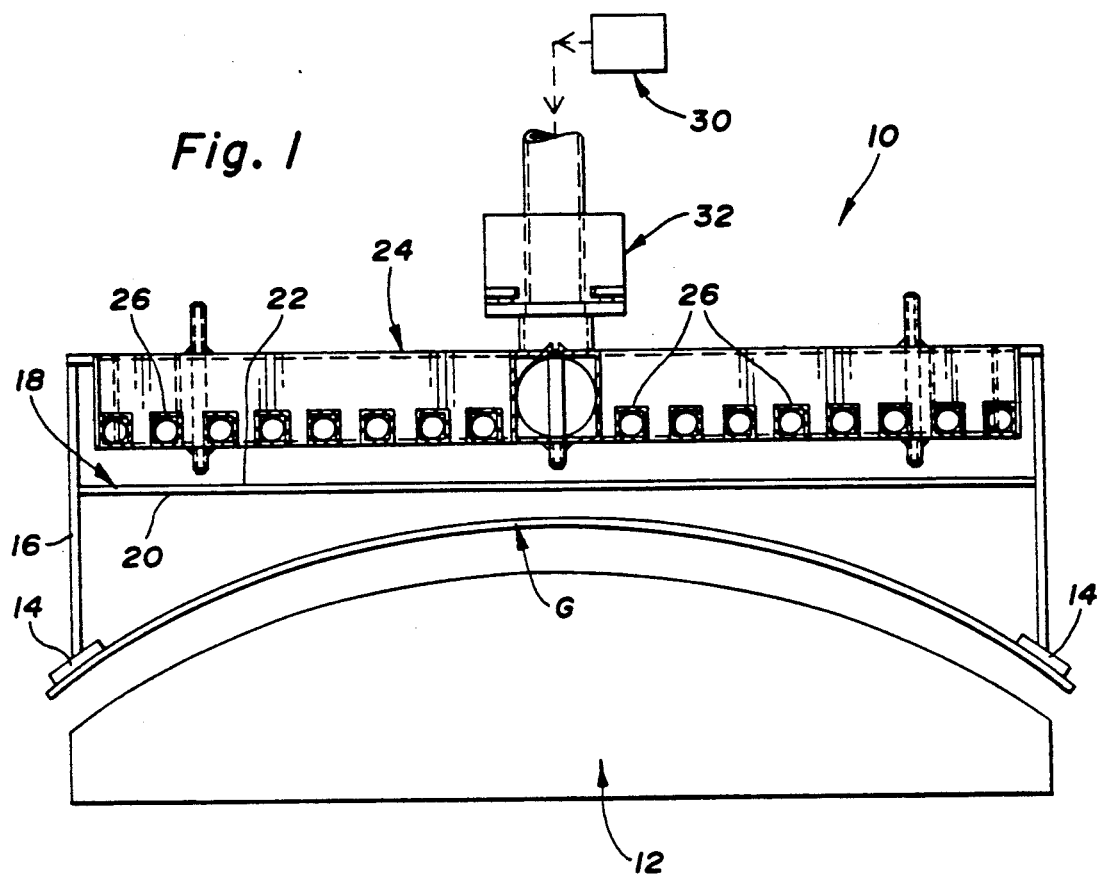
FIG. 1 is a sectional elevational view of the apparatus and a full face glass sheet shaping mold illustrating a press ring, a press ring enclosure, a heat exchanger and a freeze plate.
Figure 2:
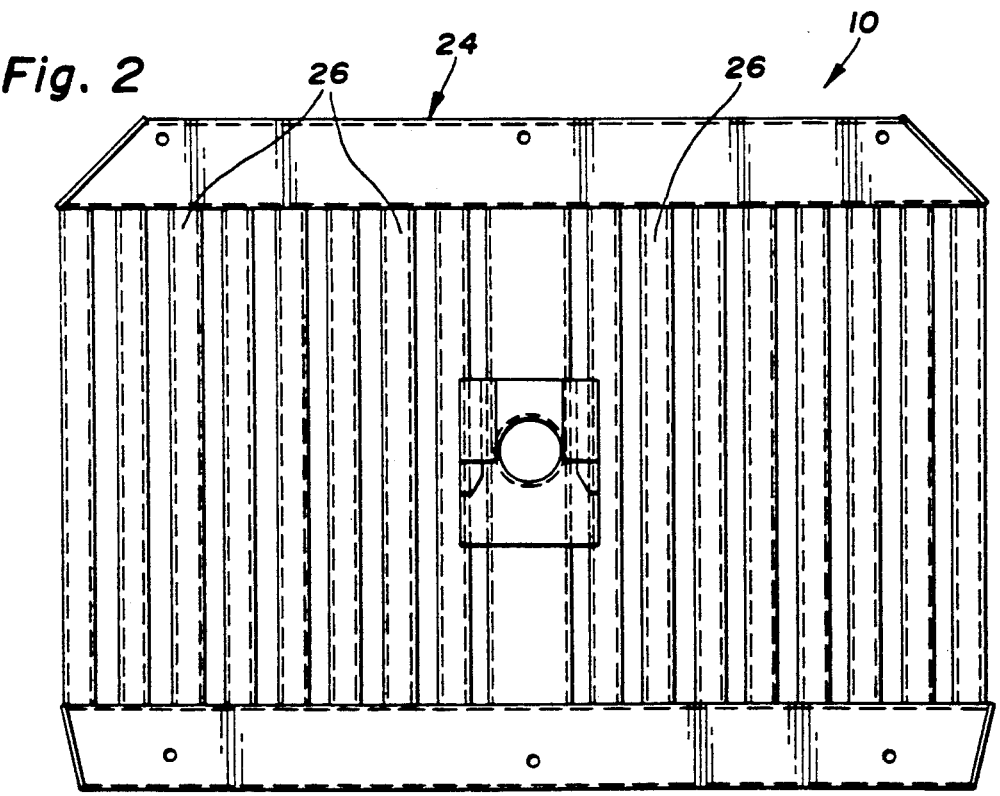
FIG. 2 is a plan view of an apparatus for radiatively cooling glass sheets constructed in accordance with the present invention.
Figure 3:
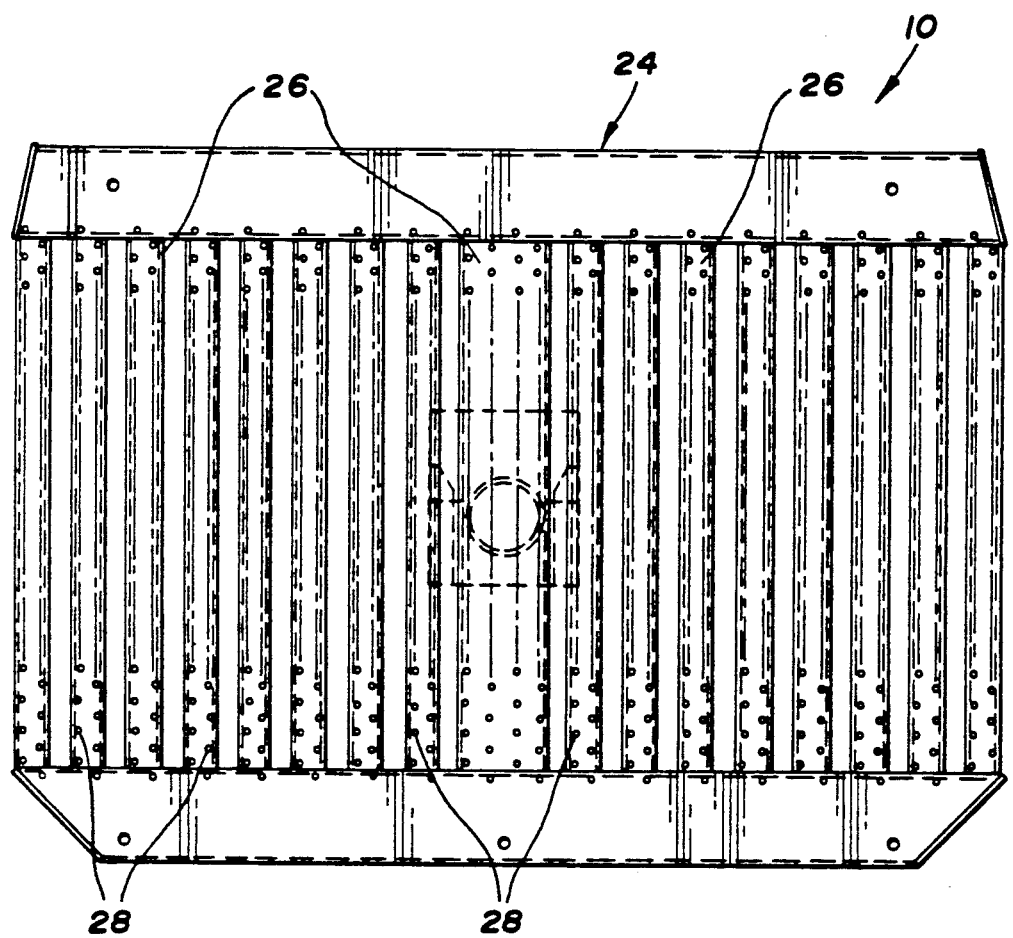
FIG. 3 is a sectional bottom plan view of the apparatus illustrating in detail the tubular construction of the heat exchanger.

Referring to FIGS. 1-3 of the drawings, an apparatus for cooling glass sheets constructed in accordance with the present invention is generally indicated by reference numeral 10 and is used in connection with an upwardly facing full face male glass sheet shaping mold 12 for radiatively cooling the surface of a glass sheet G formed on the mold immediately after the forming while the glass sheet is in contact with the shaping mold. Apparatus 10 cools the surface of the formed glass sheet G sufficiently after the forming so that its shape does not change appreciably upon further processing.

With reference to FIG. 1 of the drawings, apparatus 10 includes a glass sheet press ring 14 for forming the glass sheet G against the full face glass sheet shaping mold 12. A press ring enclosure 16 mounts the press ring. A freeze plate 18 having first and second surfaces 20,22 is mounted in the press ring enclosure 16 above the press ring. The first surface 18 of the freeze plate 18 faces downwardly toward the full face glass sheet shaping mold 12 and the glass sheet G is formed thereon.

A cooling means 24, illustrated as an air distributor heat exchanger, is mounted adjacent the second surface 22 of the freeze plate 18 for cooling the freeze plate. The freeze plate 18 is cyclically cooled between a heated ambient temperature and a temperature significantly below the glass sheet temperature for each glass sheet G formed.

It has been found that cooling a windshield single from about 590° C. to 560° C. immediately after the forming and while the glass sheet is still on the male mold 12 imparts sufficient rigidity so that its formed shape is retained during subsequent transfer and processing. The freeze plate 18 thereby radiatively cools the glass sheet G formed between the press ring 14 and full face glass sheet shaping mold 12 enough so that the glass sheet retains its shape after the forming so that as the vacuum is subsequently applied to lift the glass sheet off the male mold, the glass sheet does not deflect.

As illustrated in FIGS. 1-3 of the drawings, the air distributor heat exchanger 24 is comprised of a plurality of tubes 26. These tubes 26 communicate cooling air via holes 28 in the tubes to the second surface 22 of the freeze plate 18. A pump 30, shown schematically in FIG. 2, moves air into the air distributor 24. Pump 30 can be a blower, although the pump can be replaced with a source of compressed air.

In a preferred embodiment of the invention, a vacuum generator 32 works in connection with the pump 30 to pull heated air away from the second surface 22 of the freeze plate 18. Preferably, the freeze plate 18 is of metallic construction having a thin cross-section so that the cycling of temperature across the plate is easily obtained and to provide for rapid heat exchange between successive forming of glass sheets.

While the best mode for carrying out the invention has been described in detail, those familiar with the art to which this invention relates will recognize various alternative designs and embodiments for practicing the invention as defined by the following claims.

What is claimed is:

1. Apparatus for cooling glass sheets formed on a full face glass sheet shaping mold, the apparatus comprising:
    a glass sheet press ring for forming the glass sheet against the full face glass sheet shaping mold;
    a press ring enclosure mounting said press ring;
    a freeze plate having first and second surfaces mounted in said press ring enclosure, said first surface facing the full face glass sheet shaping mold; and
    a cooling means mounted adjacent said second surface of said freeze plate for cooling said freeze plate whereby said freeze plate radiatively cools the formed glass sheet sufficiently after forming so that its shape does not change upon further processing.

2. Apparatus as in claim 1 wherein said cooling means is an air distributer heat exchanger of a tubular construction mounted in said enclosure for communicating cool air to said second surface of said freeze plate.

3. Apparatus as in claim 2 further including a pump for moving air into said air distributor.

4. Apparatus as in claim 3 wherein said pump is a blower.

5. Apparatus as in claim 2 including a source of compressed air in communication with said air distributor.

6. Apparatus as in claim 2 wherein said cooling means also includes a vacuum generator to pull heated air away from said second surface.

7. Apparatus as in claim wherein said freeze plate is metallic and has a thin cross-section for rapid heat exchange when cooling the glass sheet generally from about 590° C. to 560° C.

8. Apparatus for cooling glass sheets formed on an upwardly facing full face male glass sheet shaping mold, the apparatus comprising:
    a downwardly facing glass sheet press ring mounted above the full face shaping mold for forming the glass sheet against the full face glass sheet shaping mold;
    a press ring enclosure mounting said press ring, said enclosure extending above said press ring;
    a freeze plate having first and second surfaces mounted in said press ring enclosure, said first surface facing downwardly toward the full face glass sheet shaping mold; and
    a heat exchanger mounted above said freeze plate generally adjacent said second surface thereof for cyclically cooling said freeze plate whereby said freeze plate radiatively cools a surface of the formed glass sheet sufficiently after forming so that the glass sheet shape does not change upon further processing.

* * * * *

UNITED STATES PATENT AND TRADEMARK OFFICE
CERTIFICATE OF CORRECTION

PATENT NO. : 5,096,480

DATED : March 17, 1992

INVENTOR(S) : CHRISTOPHER HERSCH and DONIVAN M. SHETTERLY

It is certified that error appears in the above-identified patent and that said Letters Patent is hereby corrected as shown below:

Column 4, line 14, after "claim" insert -- 1 --.

Signed and Sealed this

Twenty-fifth Day of May, 1993

Attest:

MICHAEL K. KIRK

*Attesting Officer*   *Acting Commissioner of Patents and Trademarks*